United States Patent Office 3,585,698
Patented June 22, 1971

3,585,698
METHOD OF MANUFACTURING A TELESCOPIC TUBE
Wilhelm Kamper, Wetzlar, Germany, assignor to
U.S. Philips Corporation, New York, N.Y.
Filed June 4, 1969, Ser. No. 830,432
Int. Cl. B23p 17/00, 13/00
U.S. Cl. 29—155C
3 Claims

ABSTRACT OF THE DISCLOSURE

A method of manufacturing a telescopic tube for particular use as a telescopic aerial, having intermediate springs at its lower end which establish a resilient engagement and electrical contact between the segments of the tube comprising the steps of widening one end of the tube, forming an annular groove at the transition between the widened and unwidened portions of the tube in the direction toward the widened end and finally forcing the widened portion inside out over the unwidened tube from the annular groove onwards. Slots may finally be formed in the turned up portion.

---

The invention relates to a method of manufacturing a telescopic tube, particularly for a telescopic aerial whose lower end is provided with intermediate springs which establish a resilient engagement and electrical contact between telescoped tubes.

Telescopic tubes usually consist of separate pieces which are telescoped. Rod aerials which can be collapsed like a telescope are known in which the resilient engagement and engagement and the electrical contact between the separate pieces of the tube are established with the aid of widened portions and elongated slots in these portions which are provided at the lower end of each separate piece of tube. The construction of these known telescopic aerials is a drawback in so far as slotting causes a decrease of the buckling strength of the slotted end of the tube and in addition the overall processing of the end of the piece of tube is comparatively expensive.

It is also known to provide the lower ends of the tube with forced-on springs which wedge tightly with the ends of the tube and establish a resilient contact with the encompassing tube.

The provision of additional springs also increases the manufacturing cost of a telescopic tube.

It is therefore an object of the invention to provide a method of manufacturing a telescopic tube in which the cost of constructing the intermediate springs is considerably reduced.

In a method of manufacturing a telescopic tube, particularly a telescopic aerial, the envisaged object is achieved, according to the invention, by widening a portion at one end the telescopic tube, forming an annular groove in the direction toward the widened end of the tube by axially pressing that end, into the initial portion of the transition between the unwidened and widened portion of the tube, the widened portion subsequently being forced (turned up) inside out over the unwidened tube from the annular groove onwards.

The intermediate springs are directly accordingly formed from the material of the telescopic tubes. This manufacturing and assembly operations for additional springs are omitted; only simple setting up operations succeeded by slotting are required for forming the intermediate springs. These operations can be carried out with simple tools and without expensive machines.

According to an advantageous embodiment of the method according to the invention, the bending radius of the annular groove is chosen to be smaller than the bending radius of the reversed groove or counter-groove which is formed together with the annular groove and which encompasses the annular groove. Due to this difference between the bending radii it is ensured that only the reverse groove is deplaced and the annular groove is not deplaced throughout the process of turning up the widened portion of the tube.

According to a further advantageous embodiment of the invention the portion of the tube which has been turned up is slotted up to the annular groove. The clamping action is thereby essentially increased.

In order that the invention may be readily carried into effect, an embodiment thereof will now be described in detail, by way of example, with reference to the accompanying diagrammatic drawings, in which:

FIG. 1a shows the end of a telescopic tube which has been widened with the aid of an expanding mandril, while

Figure 1A:
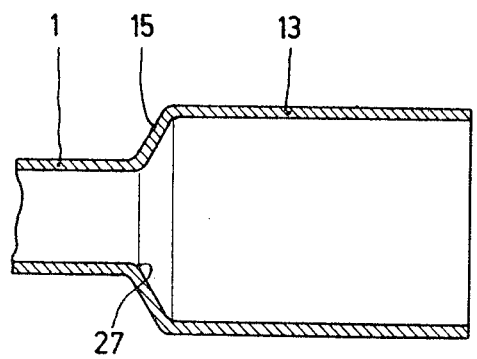

The manufacture of the telescopic tube including intermediate springs, according to the invention, begins with a metal tube 1. This metal tube 1 is widened with the aid of a mandril 3 shown in FIG. 1b. The rear end of the mandril 3 consists of a cylindrical portion 5 which changes over into a cylindrical portion 9 of a smaller diameter via a conical portion 7. The front end 11 of the cylindrical portion 9 is rounded.

Figure 1B:
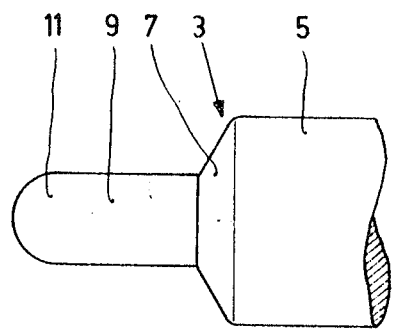
FIG. 1b shows the expanding mandril.

If this mandril shown in FIG. 1b is inserted axially into the tube 1, then the end of the tube 1 is widened corresponding to the surface of the mandril 3. The tube 1 then changes over into the widened portion 13 of the tube via a conical transition portion 15.

The next step of manufacturing is to insert the end 17 of the tube into a fitting recess 19 of a pressure member 21. Simultaneously a tubular abutment member 23 is slipped on the non-widened end of the tube 1. The front end of this tubular abutment member has an annular shoulder 25 which directly abuts the initial portion 27 of the transition 15.

If pressure member 21 and abutment member 23, 25 are pressed together the annular shoulder 25 forms an annular grove 29 directly at the initial portion 27. This annular groove has a smaller cross-section radius than that of a counter-groove 31 which is automatically formed together with the annular groove 29 and which encompasses this groove.

Figure 2:
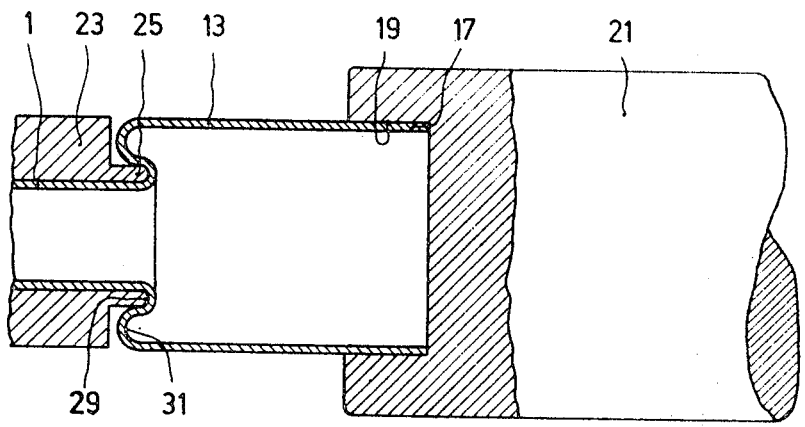
FIG. 2 shows the formation of the annular groove in the area of the initial portion.
Figure 3:
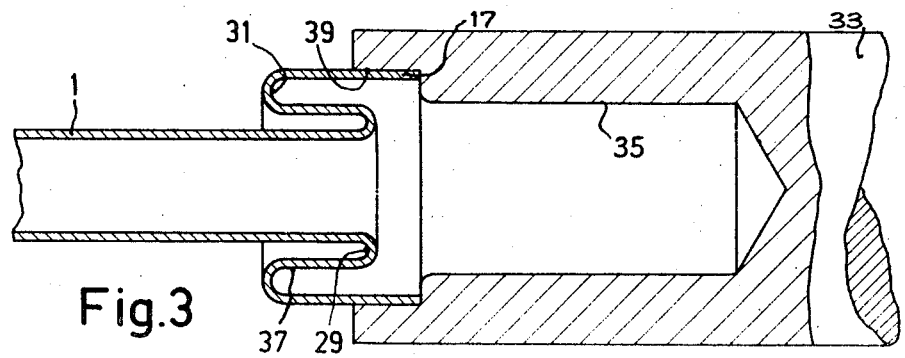
FIG. 3 shows the turning up of the widened portion of the tube.
Figure 4:
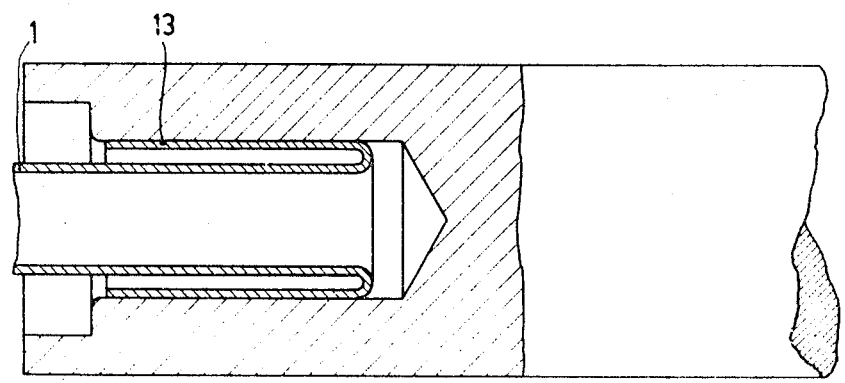
FIG. 4 shows the portion of the tube completely turned up.

After the shaping operation shown in FIG. 2 the end 17 of the tube is inserted (see FIG. 3) into a second pressure member 33. The pressure member 33 is provided with a recess 35 which corresponds to the diameter of the outer wall 37 of the annular groove 29. The recess 35 has a widened open end portion 39 corresponding in diameter to the outer diameter of the widened portion 13 of the tube. If the telescope tube 1 is pressed against the pressure member 33, the widened portion 13 of the tube is forced (turned up) over the undistorted tube 1. The groove 29 is thereby retained completely in its original form owing to the small bending radius. FIG. 3 shows an intermediate position during this turning up operation, whereas, FIG. 4 shows the portion 13 of the tube 1 completely turned up over tube 1.

Figure 5A:
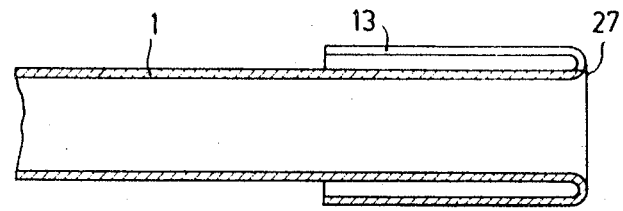
FIGS. 5a and 5b show the end of the telescopic tube provided with elongated slots in the portion of the tube which has been turned up.
Figure 5B:
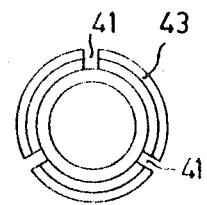

Finally the turned-up portion 13 of the tube is axially slotted. The slots 41 (FIG. 5b) continue up to the widening shoulder 27. Thus intermediate springs 43 are formed which are made from the material of the tube 1.

Figure 6:
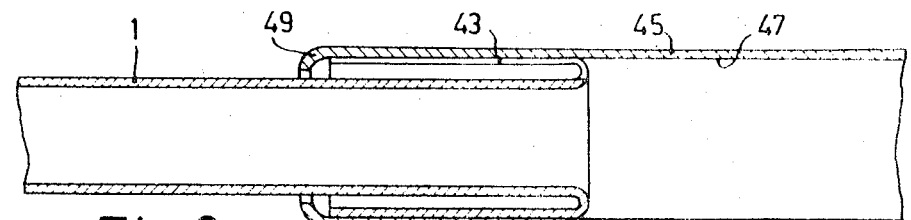
FIG. 6 shows a finished telescopic tube joint.

As is shown in FIG. 6, the tube 1 is finally slid into a second tube 45 having a larger diameter, the intermediate springs 43 resiliently engaging the inner wall 47 of the tube 45 while establishing an electrical contact. The front end 49 of the tube 45 is slightly bent over inwardly at right angles so that a stop against withdrawal of the tube 1 is formed.

It is not absolutely necessary for the groove 29 (FIG. 2) to have a smaller bending radius than that of the groove 31. When this is not the case the material of the tube will roll over via the curvation of groove 29 instead of at groove 31. An additional manufacturing step, of cutting off the tube portions 17 and 31 will then be necessary.

What is claimed is:

1. A method of manufacturing a telescopic tube, particularly for a telescopic aerial whose lower end is provided with intermediate springs which establish a resilient engagement and electrical contact between telescoped tubes, comprising the steps of widening one end of the telescopic tube thereby forming a transition portion between the widened and unwidened portions of the tube, pressing in an axial direction an annular groove in a direction toward the widened end of the tube into the initial portion of said transition portion of the tube, and forcing said widened portion inside out over the unwidened tube from the annular groove onwards.

2. The method according to claim 1 wherein the bending radius of the annular groove is smaller than the bending radius of the reverse groove which is formed together with the annular groove and which encompasses the annular groove.

3. The method according to claim 1 further comprising the step of forming slots in that portion of the tube which has been turned up, said slots extending up to the base of the annular groove.

References Cited
UNITED STATES PATENTS

| | | | |
|---|---|---|---|
| 1,904,967 | 4/1933 | Barder | 29—453X |
| 2,950,458 | 8/1960 | Artz | 339—217 |

THOMAS H. EAGER, Primary Examiner

U.S. Cl. X.R.

29—173, 600